US011799929B1

(12) United States Patent
Nandy et al.

(10) Patent No.: US 11,799,929 B1
(45) Date of Patent: Oct. 24, 2023

(54) EFFICIENT MULTICAST CONTROL TRAFFIC MANAGEMENT FOR SERVICE DISCOVERY

(71) Applicant: Hewlett Packard Enterprise Development LP, Houston, TX (US)

(72) Inventors: Tathagata Nandy, Bangalore (IN); Anil Raj, Bangalore (IN); Chakradhara Rao Gollakota, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/827,432

(22) Filed: May 27, 2022

(51) Int. Cl.
*G06F 15/16* (2006.01)
*H04L 65/611* (2022.01)
*H04L 65/75* (2022.01)
*H04L 65/65* (2022.01)

(52) U.S. Cl.
CPC ............ *H04L 65/611* (2022.05); *H04L 65/65* (2022.05); *H04L 65/75* (2022.05)

(58) Field of Classification Search
CPC ......... H04L 65/611; H04L 65/75; H04L 65/65
See application file for complete search history.

(56) References Cited

U.S. PATENT DOCUMENTS

| 11,171,796 | B2* | 11/2021 | Nandy | H04L 67/1046 |
| 2003/0115196 | A1* | 6/2003 | Boreham | G06F 16/10 |
| 2010/0290610 | A1* | 11/2010 | Gore | H04M 15/8061 |
| | | | | 379/142.15 |
| 2011/0010280 | A1* | 1/2011 | Hiscock | G06Q 10/1091 |
| | | | | 705/32 |
| 2016/0094443 | A1* | 3/2016 | Arumugam | H04L 45/245 |
| | | | | 370/390 |
| 2017/0373927 | A1* | 12/2017 | Nandy | H04L 12/185 |
| 2020/0186499 | A1* | 6/2020 | Benjamin | H04L 61/4511 |
| 2022/0191128 | A1* | 6/2022 | Alverson | H04L 45/125 |
| 2022/0217072 | A1* | 7/2022 | Singhal | H04L 45/54 |
| 2022/0225384 | A1* | 7/2022 | Takeda | H04W 72/04 |

* cited by examiner

*Primary Examiner* — Oleg Survillo
(74) *Attorney, Agent, or Firm* — Yao Legal Services, Inc.

(57) ABSTRACT

A system for facilitating efficient multicast traffic management for service discovery is provided. During operation, the system can identify a set of multicast entries associated with a multicast flow in a multicast forwarding data structure of a switch. A respective entry of the data structure can indicate how a corresponding multicast packet is forwarded. If a subset of the multicast entries shares one or more network parameters, the system can compress the subset of the multicast entries based on the shared network parameters to generate a generic entry. The generic entry can then replace the subset of the multicast entries in the data structure. Subsequently, the system can determine a multicast forwarding role of the switch and filter one or more types of multicast control messages based on the multicast forwarding role. Here, the multicast control messages can be directed to the multicast entry.

20 Claims, 12 Drawing Sheets

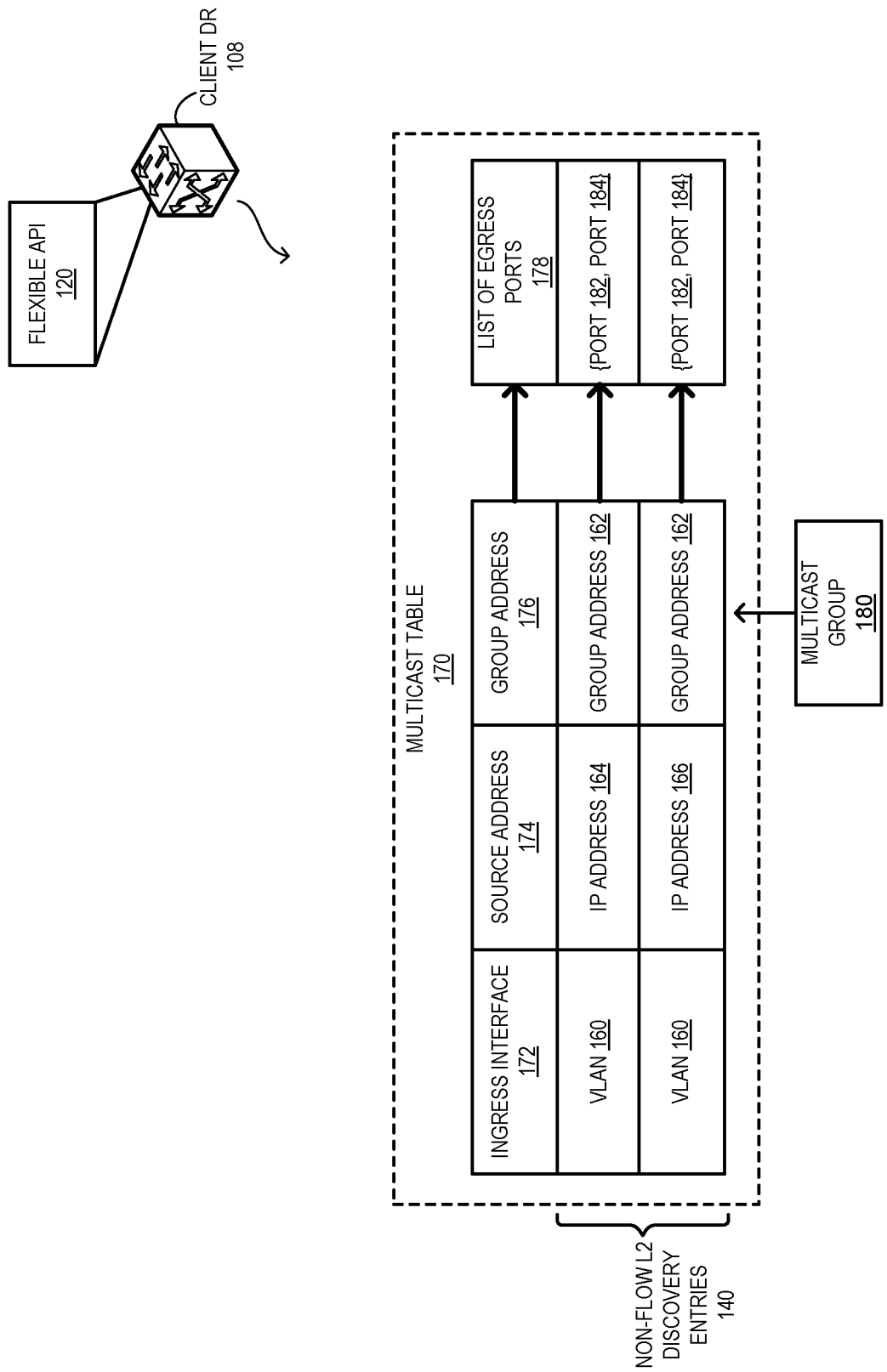

EFFICIENT MULTICAST CONTROL TRAFFIC MANAGEMENT FOR SERVICE DISCOVERY

BACKGROUND

Field

The present disclosure relates to communication networks. More specifically, the present disclosure relates to a method and system for efficiently managing multicast traffic associated with service discovery.

BRIEF DESCRIPTION OF THE FIGURES

FIG. 1C illustrates an example of non-flow layer-2 multicast discovery entries for facilitating efficient multicast control traffic management for service discovery, in accordance with an aspect of the present application.

In the figures, like reference numerals refer to the same figure elements.

DETAILED DESCRIPTION

Figure 1A:
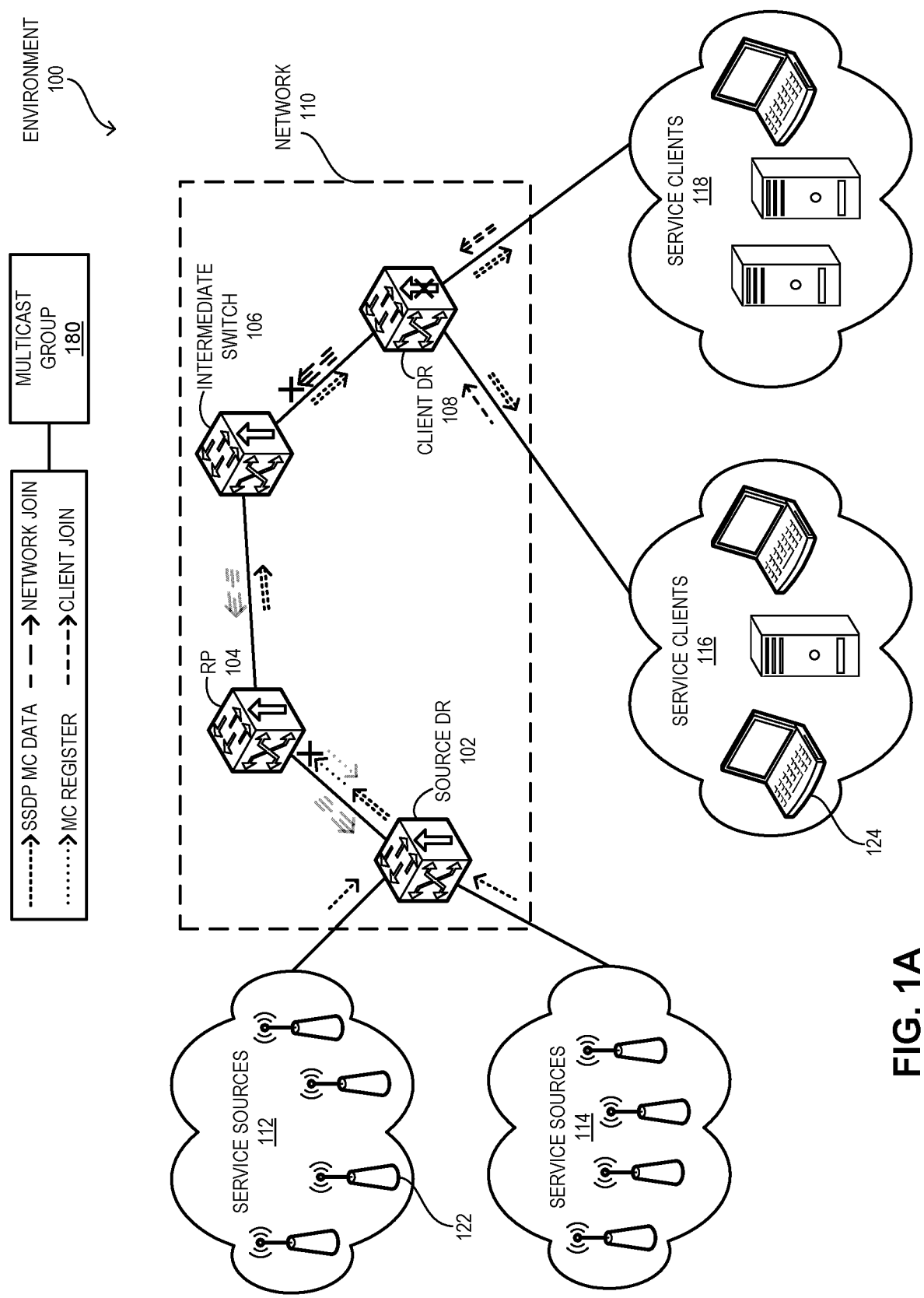
FIG. 1A illustrates an example of a network supporting efficient multicast control traffic management for service discovery, in accordance with an aspect of the present application.

The following description is presented to enable any person skilled in the art to make and use the invention, and is provided in the context of a particular application and its requirements. Various modifications to the disclosed examples will be readily apparent to those skilled in the art, and the general principles defined herein may be applied to other examples and applications without departing from the spirit and scope of the present invention. Thus, the present invention is not limited to the examples shown, but is to be accorded the widest scope consistent with the claims.

The Internet can be the delivery medium for a variety of applications running on physical and virtual devices. Such applications have brought with them an increasing demand for bandwidth. As a result, equipment vendors race to build larger switches with significant capabilities, such as Universal Plug and Play (UPnP). Such a device can allow other devices of a network to automatically discover and advertise services. To facilitate the service discovery, a respective device in the network may deploy the Simple Service Discovery Protocol (SSDP).

The SSDP instance on a service provider device may periodically send multicast messages to a reserved multicast address to advertise the service (e.g., printing, media storage, streaming, etc.) the device may provide. The device providing the service can be referred to as a service source or provider. On the other hand, a device requesting the service can be referred to as a service client or requester. A service client may send a client-side multicast join (e.g., an Internet Group Management Protocol (IGMP) join) to indicate the interest in receiving the service from a corresponding service source for a specific group.

The examples described herein solve the problem of high resource utilization of the multicast flows at network switches by (i) configuring a set of non-flow driven multicast entries associated with multicast flows at the switches; and (ii) compressing multiple such entries, if allowed, to program a compressed and enhanced multicast entry. Since the multicast entries can be programmed at a switch without processing the multicast advertisements from the client, the switch can facilitate service discovery without incurring high computing resource utilization during the service discovery period. Furthermore, the compressed multicast entry can reduce the utilization of limited forwarding resources at the switch.

In a Universal Plug and Play (UPnP) environment, devices may use Simple Service Discovery Protocol (SSDP) to discover and advertise services, such as printing, streaming, and storage. SSDP is an application layer protocol that can facilitate the service discovery for a device in the network. Typically, an SSDP instance on a service source (or source) may send multicast discovery and advertisement messages, which can be referred to as discovery messages, to a multicast group address. For example, for the Internet Protocol (IP) version 4 (IPv4) and version 6 (IPv6), the address can be 239.255.255.250:1900 and FF0x::C, respectively. The source may periodically (and upon obtaining an IP address after booting up) send multicast packets comprising corresponding discovery messages. When a service client (or client) receives a discovery message, the client may request the advertised service. The client may send a client multicast join (e.g., an IGMP join) to indicate the interest in the service.

With existing technologies, a respective source in the UPnP environment may generate a unique multicast flow. The flow can be referred to as a service flow and indicated by the source IP address and the multicast group IP address associated with SSDP. If a network supports a large number of service sources and clients (e.g., end devices), the number of multicast joins associated with SSDP can be large. Since a respective device may create a unique flow, a large number of sources and clients can generate a large number of multicast data and control packets in the network. Processing these multicast packets can lead to high utilization of the hardware and software resources at the switches of the network.

For example, when a switch in the network processes these packets, the large processing overhead can cause high utilization of the central processor of the switch. With large numbers of sources and clients, the switches may not have available resources for processing other network packets, leading to the denial of services. Furthermore, a respective client may periodically send a join to maintain access to the service. As a result, the total number of client joins can also become large and disrupt other operations at the switch. In addition to the service flows, many other multicast flows may traverse the network. As a result, a network may have a large number of multicast flows, thereby causing high resource utilization at the switches of the network.

To solve this problem, switches of the network can program one or more non-flow-driven multicast entries associated with the multicast flows, such as the service flows, in corresponding multicast data structures (e.g., the multicast forwarding tables). These entries identify the service flows and indicate the egress interfaces for the corresponding service flows. In other words, these entries facilitate the multicast-based service discovery in the network. However, instead of generating an entry by processing the multicast control packets of a service flow, the entry can be pre-programmed without processing the control packets of individual flows. For example, a flexible Application Programming Interface (API) can support a template of the entries. A user (e.g., an administrator) can define the entries using the template based on the configuration information of the sources. Moreover, the switch may obtain the configuration information of the sources (e.g., from a management platform, such as a controller) and generate the entries based on the template.

Since the entries facilitate service discovery and are not generated by processing the packets of individual service flows, the entries can be referred to as non-flow discovery entries. Furthermore, to ensure client multicast joins, such as IGMP joins, requesting services do not lead to overutilization, the edge switches can program non-flow driven layer-2 multicast entries associated with the service flows in corresponding multicast data structures. These entries identify the service flows and indicate the egress ports for the corresponding service flows. Upon detecting the entries associated with service flows, the switches can suppress the processing of the multicast packets for the service flows. The switches can then save the processing resources, thereby facilitating service discovery in the network without straining the processing resources.

Typically, to support efficient service discovery, the network can include a source DR, a client DR, and a multicast RP. Here, the source DR can be the switch via which the sources are reachable; and the Client DR can be the switch receiving the client joins requesting services. A client join, such as an IGMP join, can be a join message sent by an end device to request multicast data belonging to a multicast group. The rest of the switches can facilitate communication among sources, clients, and the RP. Since the discovery entries can be already programmed, the switches can avoid forwarding the unknown multicast packets and the network joins of the multicast group associated with SSDP to the local processor, thereby bypassing the processing overhead for the packets. A network join, such as a PIM join, can be a join message sent by a network switch to join a multicast distribution tree of a corresponding multicast group. In this way, the multicast data packets matching the discovery entries can be forwarded to the egress interfaces without processing the control packets.

In this disclosure, the term "switch" is used in a generic sense, and it can refer to any standalone or fabric switch operating in any network layer. "Switch" should not be interpreted as limiting examples of the present invention to layer-2 networks. Any device that can forward traffic to an external device or another switch can be referred to as a "switch." Any physical or virtual device (e.g., a virtual machine or switch operating on a computing device) that can forward traffic to an end device can be referred to as a "switch." Examples of a "switch" include, but are not limited to, a layer-2 switch, a layer-3 router, a routing switch, a component of a Gen-Z or Compute Express Link (CXL) network, a processor device, or a fabric switch comprising a plurality of similar or heterogeneous smaller physical and/or virtual switches.

A phrase indicating a device, such as "node," "machine," "entity," or "device" may indicate a switch and an end host, such as a user device. The term "message" refers to a group of bits that can be transported together across a network. "Message" should not be interpreted as limiting examples of the present examples to a particular layer of a network. "Message" can be replaced by other terminologies referring to a group of bits, such as "information," "data," "request," "response," "packet," "frame," "cell," "datagram," or "transaction." Furthermore, the term "port" can refer to the port that can receive, store, or transmit data. "Port" can also refer to the hardware, software, and/or firmware logic that can facilitate the operations of that port.

FIG. 1A illustrates an example of a network supporting efficient multicast control traffic management for service discovery, in accordance with an aspect of the present application. A UPnP environment 100 can include a network 110 that can facilitate service discovery and advertisement. Network 110 can include a plurality of switches 102, 104, 106, and 108. In some examples, network 110 can be an Ethernet, InfiniBand, PCIe, Gen-Z, CXL, or other networks, and may use a corresponding communication protocol, such as Internet Protocol (IP), FibreChannel over Ethernet (FCoE), or other protocol. Service sources 112 and 114 can provide one or more services in environment 100 and be reachable via network 100 from service clients 116 and 118.

One or more links in network 110 can be tunnels. Examples of a tunnel can include, but are not limited to, VXLAN, Generic Routing Encapsulation (GRE), Network Virtualization using GRE (NVGRE), Generic Networking Virtualization Encapsulation (Geneve), Internet Protocol Security (IPsec). A VPN, such as an EVPN, can be deployed over network 110. Network 110 can include a virtual gateway switch (VGS) that can couple network 110 to external networks and devices. Here, a plurality of switches of network 110 (not shown in FIG. 1A) can operate as a single switch in conjunction with each other to facilitate the VGS. The VGS can be associated with one or more virtual addresses (e.g., a virtual IP address and/or a virtual MAC address).

In UPnP environment 100, sources and clients may use SSDP to discover and advertise services, such as printing, streaming, and storage. Typically, an SSDP instance on a source 122 may send multicast discovery messages for a multicast group 180. Such messages are sent to a multicast group IP address associated with multicast group 180. For example, for IPv4 and IPv6, the address can be 239.255.255.250:1900 and FF0x::C, respectively. When source 122 boots up and obtains an IP address, source 122 may send multicast packets comprising corresponding discovery messages. Source 122 can continue to send periodic discovery messages while in operation. When a client 124 receives a discovery message, client 124 may request the advertised service. Client 124 may send a client join, such as an IGMP join, to indicate the interest in the service.

With existing technologies, each of sources 112 and 114 in environment 100 may generate a unique multicast service flow. The service flow can be indicated by the source IP address and the multicast group IP address associated with multicast group 180. If the number of sources and clients in environment 100 is large, the number of multicast joins associated with SSDP can be large. Since a respective device may create a unique flow, a large number of sources and clients can generate a large number of multicast data and control packets in network 110. Processing these multicast packets can lead to high utilization of the hardware and software resources (denoted with respective up arrows) at the switches of network 110.

For example, when a switch 102 in the network processes these packets, the large processing overhead can cause high utilization of the central processor of switch 102. With large numbers of sources and clients, switch 102 may not have available resources for processing other network packets, leading to denial of services at switch 102. Furthermore, each of clients 116 and 118 may periodically send a join to maintain access to the service. As a result, the total number of client joins in network 110 can also become large and disrupt other operations at switch 108 coupling clients 116 and 118. In addition to the service flows, many other multicast flows may traverse network 110. As a result, network 110 may have a large number of multicast flows, thereby causing high resource utilization at switches 102, 104, 106, and 108.

To solve this problem, one or more switches, such as switch 102, of network 110 can program a set of non-flow-driven discovery entries associated with multicast flows, such as the service flows, in their respective local multicast forwarding tables. These entries can identify the service flows based on the source and multicast group IP address pair, and indicate the egress interfaces (e.g., a virtual local area network (VLAN) for the corresponding service flows. However, instead of generating an entry by processing the multicast control packets from sources 112 and 114, the discovery entries can be pre-programmed at switch 102 without processing the control packets.

For example, a flexible API can support a template of the discovery entries. A user (e.g., an administrator) can define the discovery entries for switch 102 using the template based on the configuration information of sources 112 and 114. Moreover, switch 102 may obtain the configuration information of sources 112 and 114 (e.g., from a management platform) and generate the discovery entries based on the template. Furthermore, to ensure client joins do not lead to overutilization, switch 108 can program layer-2 discovery entries associated with the service flows in corresponding multicast data structures. These entries identify the service flows and indicate the egress ports (e.g., physical ports of switch 108) for the corresponding service flows.

Upon detecting the entries associated with service flows, the switches with pre-programmed discovery entries can suppress the processing of the multicast packets for the service flows. The switches can then save the processing resources, thereby facilitating service discovery in the network without straining the processing resources. Typically, to support efficient service discovery, switches 102, 108, and 104 can operate as a source DR, a client DR, and a multicast RP, respectively. Switch 106 can facilitate communication among sources, clients, and the RP. Hence, switches 102, 108, and 104 can also be referred to as source DR 102, client DR 108, and RP 104. Since the discovery entries can be already programmed, source DR 102, client DR 108, and RP 104 can avoid forwarding the unknown multicast packets and the network joins (e.g., PIM joins) of multicast group 180 to the local processor.

For example, client DR 108 can suppress the client joins received from clients 116 and 118 without processing them (denoted with a cross). Client DR 108 can then avoid sending the client joins via network 100 and use layer-2 discovery entries in the local multicast forwarding table to forward multicast data packets associated with SSDP. Similarly, source DR can avoid sending multicast register packets to RP 104. In this way, source DR 102, client DR 108, and RP 104 can forward multicast data packets matching the discovery entries without processing the control packets, thereby avoiding the processing overhead for the control packets.

Intermediate switches, such as switch 106, can operate with or without the management of multicast control traffic associated with service discovery. In particular, if source DR 102, client DR 108, and RP 104 preprogram the discovery entries and suppress the processing of multicast control packets associated with SSDP, the corresponding control packets may not be forwarded in network 100. As a result, switch 106 may not receive those control packets. For example, if client DR 108 does not send network joins, switch 106 would not need to process and forward those joins.

Figure 1B:
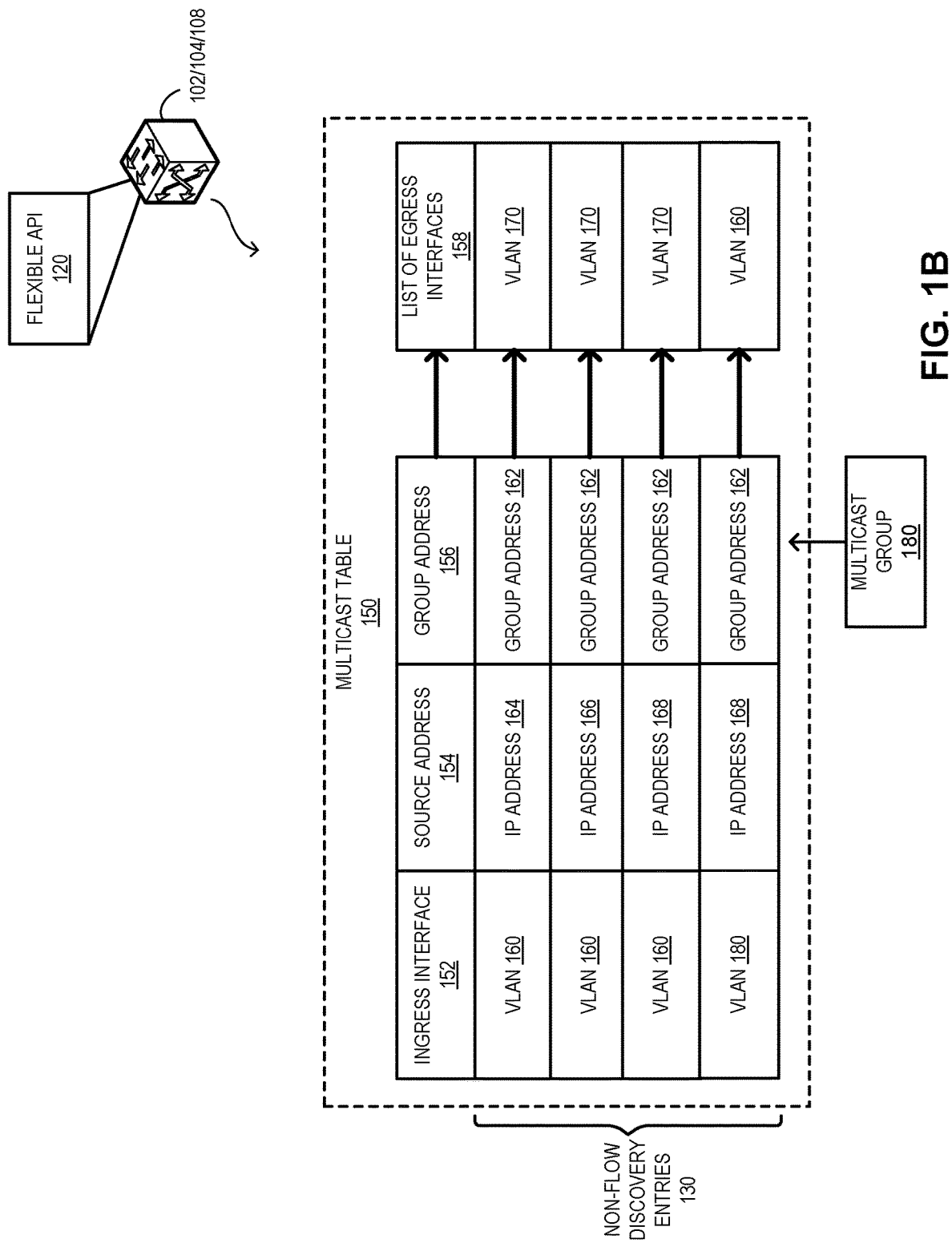
FIG. 1B illustrates an example of non-flow multicast discovery entries for facilitating efficient multicast control traffic management for service discovery, in accordance with an aspect of the present application.

The non-flow-driven discovery entries for multicast routes associated with SSDP flows can be created using a flexible programming API. FIG. 1B illustrates an example of non-flow multicast discovery entries for facilitating efficient multicast control traffic management for service discovery, in accordance with an aspect of the present application. A flexible programming API 120 instance running on each of switches 102, 104, and 108 can facilitate a template for generating discovery flows associated with SSDP in a multicast table 150 of the corresponding switch. The format of the template can map a tuple comprising (ingress_interface, source IP address, multicast group IP address) to a list of egress interfaces. Multicast table 150 can include a set of non-flow discovery entries 130 conforming to the template. Entries 130 can be generated by the local switch based on the information associated with sources or programmed by a user using API 120.

Here, a respective discovery flow can be identified by the (source IP address, multicast group IP address) pair in the tuple. The source IP addresses may vary based on the IP address of the corresponding service source. On the other hand, the multicast group IP address can be an IP address pre-allocated for SSDP. Accordingly, multicast table 150 can include respective columns for an ingress interface 152, a source address 154, and a multicast group address 156. The tuple formed by these parameters can be mapped to a list of egress interfaces 158 in multicast table 150.

For example, discovery entries 130 can include an entry with a VLAN 160 as the ingress interface, an IP address 164 as the source IP address, and a group IP address 162 as the multicast group address. Here, group IP address 162 can be allocated to multicast group 180. The entry can map these parameters to a VLAN 170 as the list of egress interfaces. Hence, the entry can include (VLAN 160, IP address 164, multicast group IP address 162)→[VLAN 170]. Similarly, discovery entries 130 can include (VLAN 160, IP address 166, multicast group IP address 162)→[VLAN 170] and (VLAN 160, IP address 168, multicast group IP address 162)→[VLAN 170]. For another VLAN 180, discovery entries 130 can include (VLAN 180, IP address 168, multicast group IP address 162)→[VLAN 160].

FIG. 1C illustrates an example of non-flow layer-2 multicast discovery entries for facilitating efficient multicast control traffic management for service discovery, in accordance with an aspect of the present application. API 120 can also facilitate a template for generating layer-2 discovery flows associated with SSDP in a multicast table 170 of switch 108. The format of the template can map a tuple comprising (ingress_interface, source IP address, multicast group IP address) to a list of egress ports. The clients (e.g., clients 116 and 118 in FIG. 1A) can be reachable from client DR 108 via these egress ports. Multicast table 170 can include a set of non-flow layer-2 discovery entries 140 conforming to the template. Entries 140 can be generated by the local switch based on the information associated with clients or programmed by a user using API 120.

Since entries 140 can be preprogrammed in multicast table 170, client DR 108 can filter the client joins (i.e., ignore the client joins and drop them). Accordingly, multicast table 170 can include respective columns for an ingress interface 172, a source address 174, and a multicast group address 176. The tuple formed by these parameters can be mapped to a list of egress ports 178 in multicast table 170. Suppose that the clients are reachable from client DR 108 via ports 182 and 184 of client DR 108. Hence, the list of egress ports can include ports 182 and 184 of client DR 108.

For example, layer-2 discovery entries 140 can include an entry with a VLAN 160 as the ingress interface, an IP address 164 as the source IP address, and a group IP address 162 as the multicast group address. The entry can map these parameters to ports 182 and 184 as the list of egress ports. Hence, the entry can include (VLAN 160, IP address 164, multicast group IP address 162)→{port 182, port 184}. Similarly, discovery entries 140 can also include (VLAN 160, IP address 166, multicast group IP address 162)→{port 182, port 184}.

Figure 2:
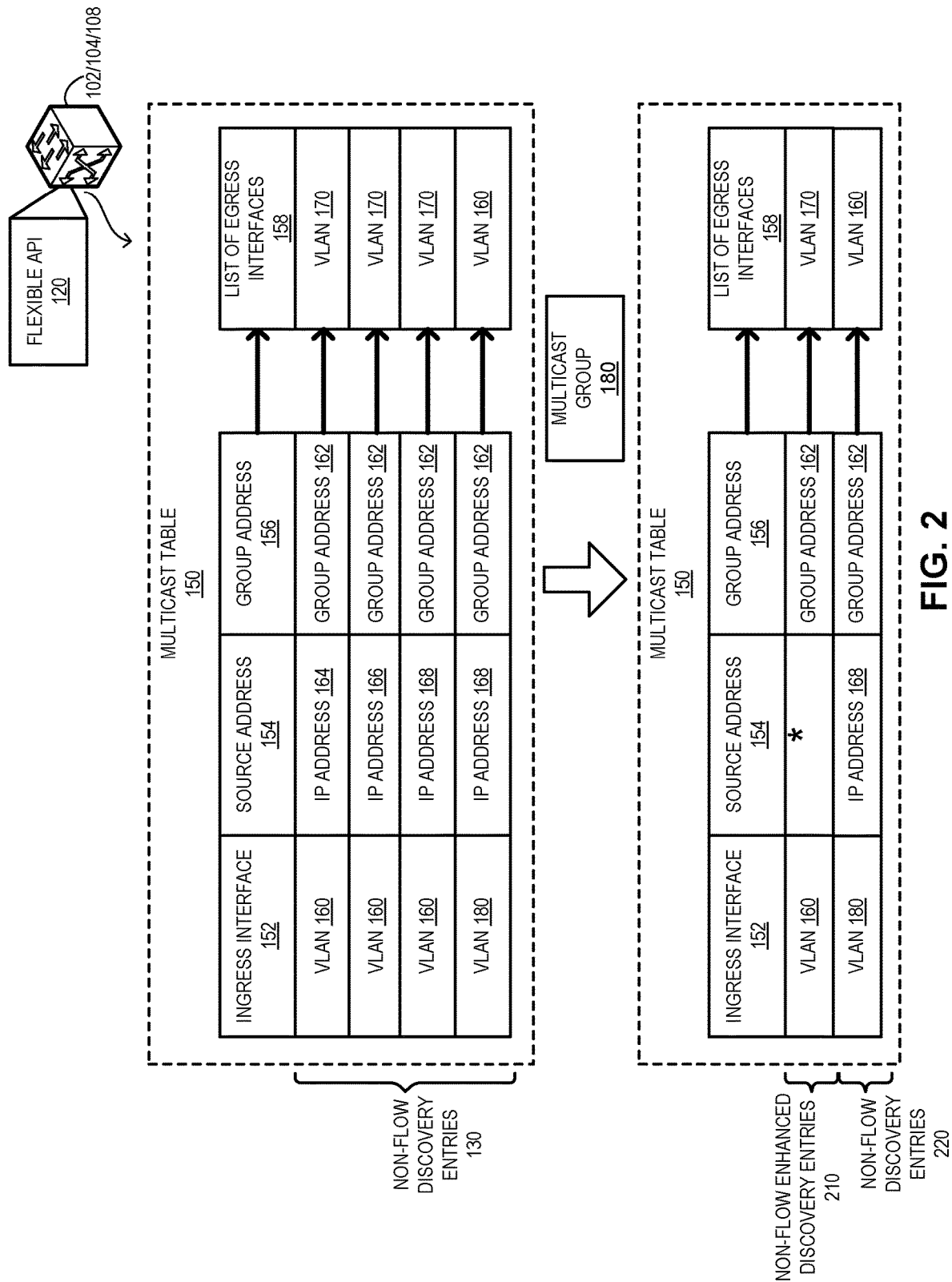
FIG. 2 illustrates an example of generating enhanced discovery entries from non-flow multicast discovery entries, in accordance with an aspect of the present application.

If the number of sources is large, the number of discovery entries can be large and may occupy a significant portion of forwarding resources, such as content-addressable memory (CAM) space. A switch can consolidate a subset of the discovery entries to reduce resource utilization. FIG. 2 illustrates an example of generating enhanced discovery entries from non-flow multicast discovery entries, in accordance with an aspect of the present application. If the switch identifies a set of entries for different sources having a common ingress interface, multicast group IP address, and egress interfaces, the switch can consolidate the set of entries to generate an enhanced discovery entry, which can be a compressed representation of the set of entries.

For example, the switch can parse discovery entries 130 to determine a subset of entries 130 with VLAN 160 as the ingress interface, group IP address 162 as the multicast group IP address, and VLAN 170 as the egress interface. Even though these entries have different source IP addresses, this subset of entries can be consolidated and represented with a compressed entry of (*, group IP address 162). This entry can be referred to as an enhanced discovery entry. Here, the enhanced discovery entry can have a "wildcard" value (denoted with a "*") as source address 154. The wildcard value can indicate that a packet with any source IP address matching the rest of the fields of the entry can lead to a match for the entry. Hence, a single compressed entry programmed in the hardware of the switch can be sufficient to handle multiple (source IP address, group IP address) flows, thereby saving network resources at the switch.

The switch can repeat this process to generate an enhanced discovery entry for each such subset of discovery entries. In this way, multicast table 150 can include one or more non-flow enhanced discovery entries 210. The remaining non-consolidated entries can remain as (source IP address, group IP address) flows. For having different ingress and egress interfaces, the entry comprising (VLAN 180, IP address 168, multicast group IP address 162)→[VLAN 160] may not be consolidated. Therefore, multicast table 150 can also include non-flow discovery entries 220, which may include a subset of discovery entries 130 that may not be consolidated into an enhanced discovery entry.

Figure 3A:
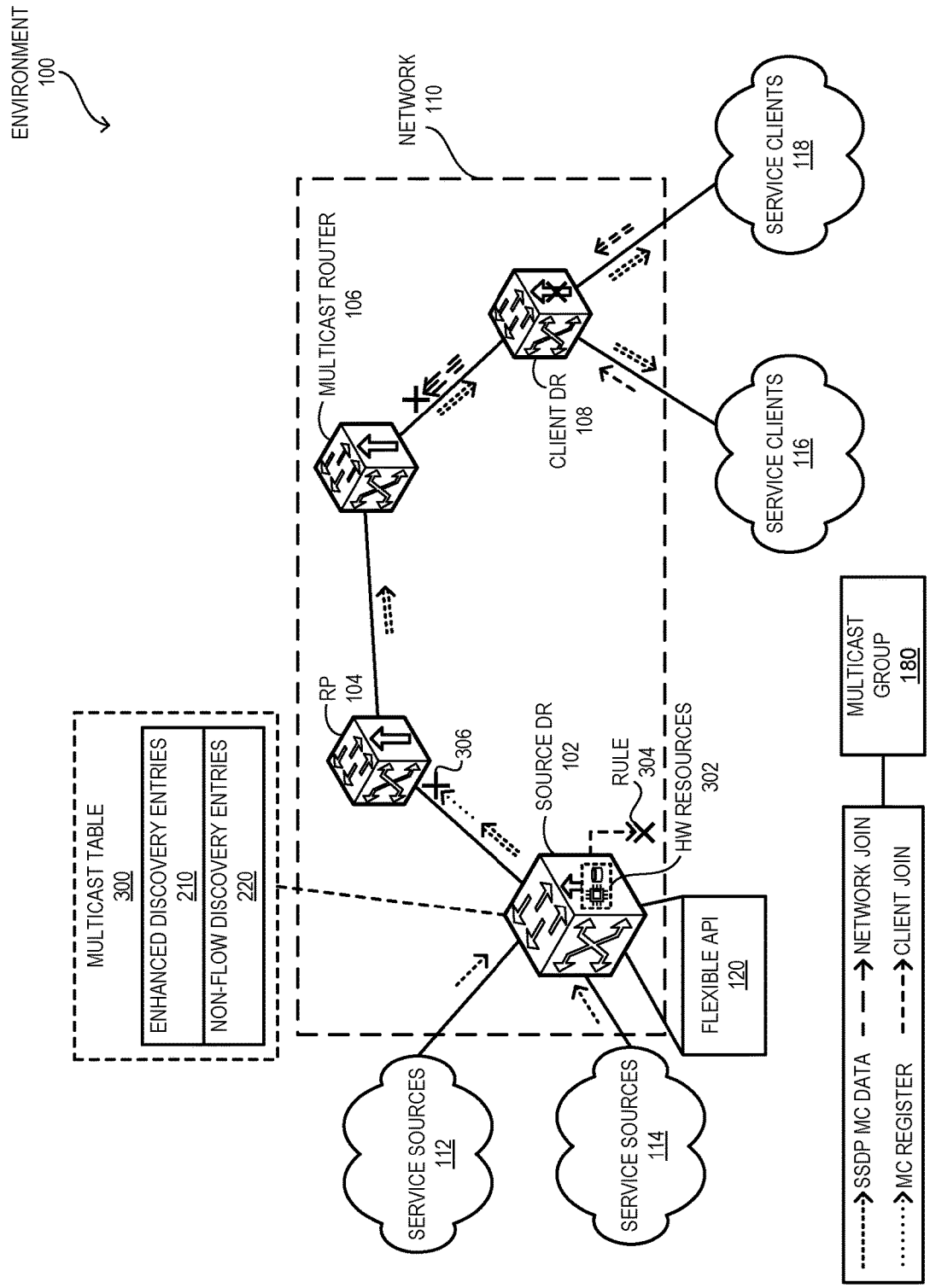
FIG. 3A illustrates an example of a source designated router (DR) managing multicast control traffic associated with service discovery, in accordance with an aspect of the present application.

FIG. 3A illustrates an example of a source DR managing multicast control traffic associated with service discovery, in accordance with an aspect of the present application. In environment 100, sources 112 and 114 are reachable via switch 102. Hence, switch 102 can be responsible for registering the discovery flows with RP 104 when the sources initiate the flows. Therefore, switch 102 can operate as the source DR in network 110. During operation, API 120 can be used to program a set of non-flow discovery entries in multicast table 300 of source DR 102. Based on the programmed entries, source DR 102 can generate non-flow enhanced discovery entries 210 and maintain the rest of the entries as non-flow discovery entries 220 in multicast table 300.

Source DR 102 can use multicast table 300 to forward multicast data traffic. Hence, source DR 102 can forward multicast data traffic associated with service discovery using the non-flow entries in multicast table 300. As a result, source DR 102 may not need to process the multicast control packets that typically generate such entries, thereby reducing the load on hardware resources 302 of source DR 102. In addition, source DR 102 can program a rule 304 (e.g., an Access Control List (ACL) rule) that instructs source DR 102 to filter (or drop) the client joins for multicast group 180. This can prevent source DR 102 from forwarding such joins received from a downstream switch that does not facilitate efficient multicast control traffic management for service discovery.

Furthermore, because of the non-flow discovery entries, how the multicast data traffic is going to be forwarded for multicast group 180, which is associated with service discovery, can already be established at source DR 102. In particular, the egress interfaces for the multicast data traffic associated with service discovery can be predefined in the non-flow discovery entries in multicast table 300 without depending on the register-specific operations. Consequently, source DR 102 can forward multicast traffic without registering with RP 104. Accordingly, source DR 102 may not send a multicast register message to RP 104 (suppression 306).

Figure 3B:
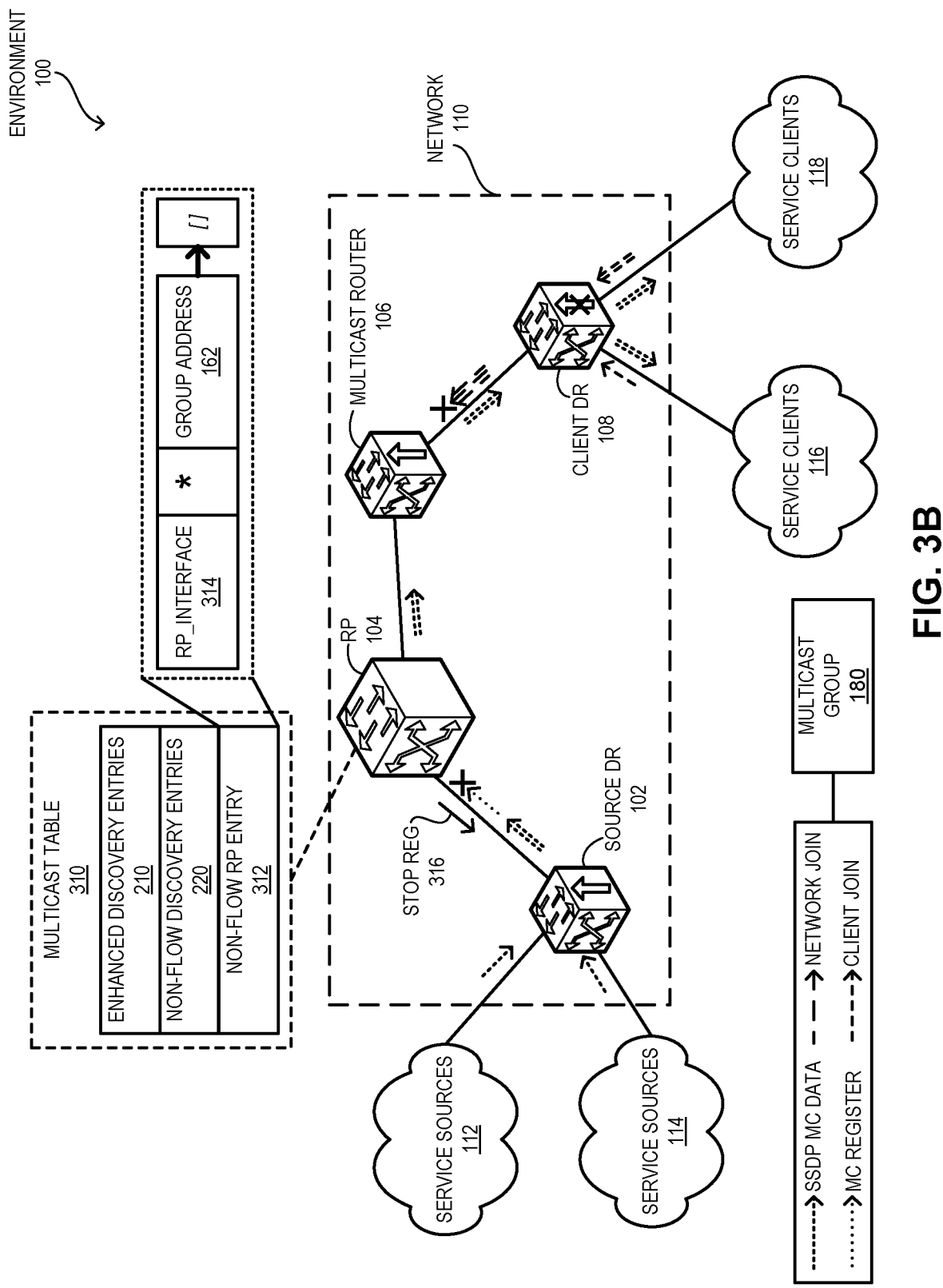
FIG. 3B illustrates an example of a rendezvous point (RP) managing multicast control traffic associated with service discovery, in accordance with an aspect of the present application.

FIG. 3B illustrates an example of an RP managing multicast control traffic associated with service discovery, in accordance with an aspect of the present application. In environment 100, switch 104 can operate as the RP of multicast group 180. Therefore, switch 104 can operate as the RP in network 110. During operation, API 120 can be used to program a set of non-flow discovery entries in multicast table 310 of RP 104. Based on the programmed entries, RP 104 can generate non-flow enhanced discovery entries 210 and maintain the rest of the entries as non-flow discovery entries 220 in multicast table 310.

If the non-flow entries are not programmed at source DR 102, the non-flow entries of multicast table 310 allow RP 104 to filter (or drop) register packets from source DR 102. RP 104 can then clear a respective pending registration and stop processing subsequent new registrations for multicast group 180. Furthermore, a non-flow-driven multicast route can be programmed using API 120 in multicast table 310 for the RP interface 314 for multicast group 180. This entry can be referred to as non-flow RP entry 312. Since multicast group IP address 162 is associated with multicast group 180, non-flow RP entry 312 can include (RP_interface 314, *, multicast group IP address 162)→[ ].

Non-flow RP entry 312 can allow RP 104 to suppress a respective register packet matching multicast group 180 directed to RP 104. Furthermore, RP 104 can send a stop register packet 316 to source DR 102. Consequently, source DR 102 may not send a subsequent register packet to RP 104. It should be noted that the non-flow discovery entries of multicast table 310 can allow RP 104 to forward multicast data traffic, and non-flow RP entry 312 can allow RP 104 to suppress register packets. Hence, RP 104 can facilitate efficient multicast control traffic management for service discovery in network 110 even if other switches do not incorporate the non-flow discovery entries.

Figure 3C:
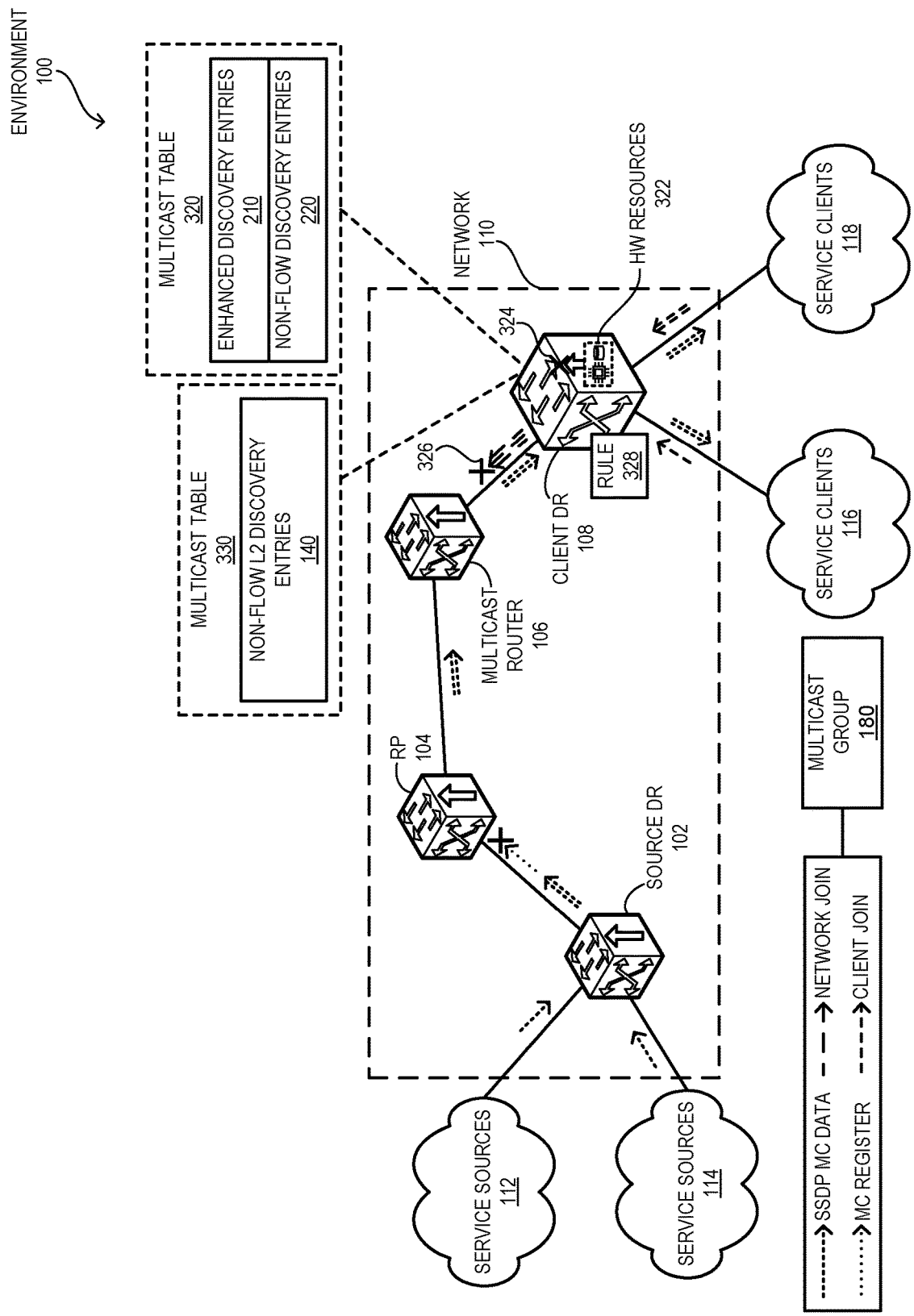
FIG. 3C illustrates an example of a client DR managing multicast control traffic associated with service discovery, in accordance with an aspect of the present application.

FIG. 3C illustrates an example of a client DR managing multicast control traffic associated with service discovery, in accordance with an aspect of the present application. In environment 100, clients 116 and 118 are reachable via switch 108. Hence, client joins are sent switch 108. Therefore, switch 108 can operate as the client DR in network 110. During operation, API 120 can be used to program a set of non-flow discovery entries in multicast table 320 of client DR 108. Based on the programmed entries, client DR 108 can generate non-flow enhanced discovery entries 210 and maintain the rest of the entries as non-flow discovery entries 220 in multicast table 320.

The non-flow discovery entries of multicast table 320 can allow client DR 108 to forward multicast data traffic without processing the multicast control packets (suppression 324), thereby reducing the load on hardware resources 322 of client DR 108. Moreover, a large number of client joins may arrive at client DR 108 from clients 116 and 118. To control the flooding, API 120 can be used to program a set of non-flow layer-2 discovery entries 140 in layer-2 multicast table 330 of client DR 108. Discovery entries 140 can prevent client joins from clients 116 and 118 over-utilizing network 110.

Typically, client DR 108 may send network joins for multicast group 180 toward RP 104. However, with non-flow layer-2 discovery entries 140 in layer-2 multicast table 330, client DR 108 can suppress network joins (e.g., PIM joins) in network 110 (suppression 326). In addition, client DR 108 can program a rule 328 (e.g., an ACL rule) that instructs client DR 108 to filter (or drop) client joins for multicast group 180 for the first hop devices. Such devices can be coupled to client DR 108 in one hop (e.g., clients 116 and 118). Rule 328 may prevent unnecessary processing of control traffic from clients 116 and 118.

Figure 4A:
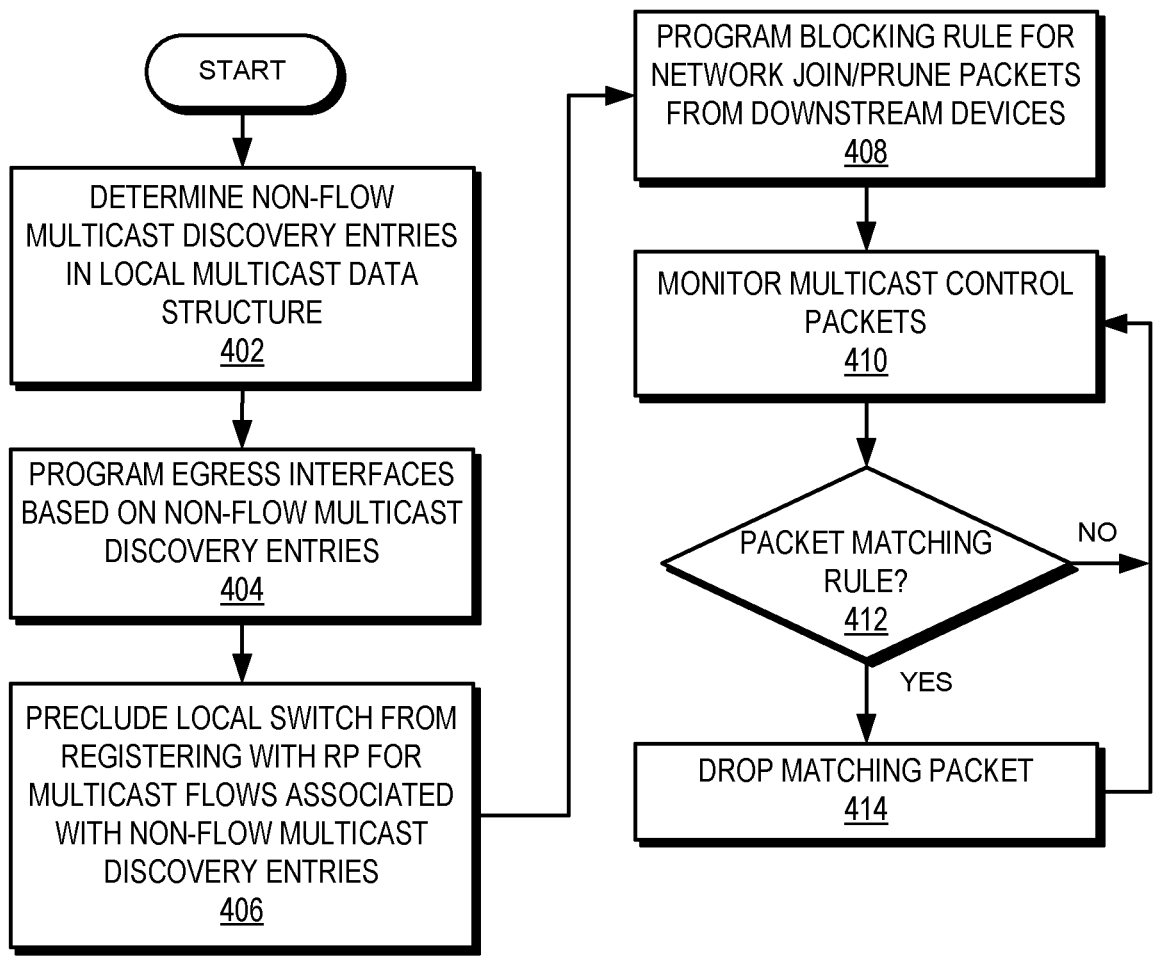
FIG. 4A presents a flowchart illustrating the process of a source DR managing multicast control traffic associated with service discovery, in accordance with an aspect of the present application.

FIG. 4A presents a flowchart illustrating the process of a source DR managing multicast control traffic associated with service discovery, in accordance with an aspect of the present application. During operation, the source DR can determine non-flow multicast discovery entries in a local multicast data structure (operation 402). The entries can be programmed by a user or generated by the source DR based on information associated with the sources. The source DR can then program egress interfaces based on the non-flow multicast discovery entries (operation 404). Accordingly, the source DR can preclude the local switch (i.e., the source DR) from registering with the RP for the multicast flows associated with the non-flow multicast discovery entries (operation 406).

The source DR can then program a blocking rule for network join/prune packets from downstream devices (operation 408). Subsequently, the source DR can monitor the multicast control packets (operation 410). The source DR can then determine, for a respective received packet, whether the packet matches the rule (operation 412). If the source DR receives a packet matching the rule, the source DR can drop the matching packet (operation 414). If a packet matching the rule is not received (operation 412) or upon dropping the matching packet (operation 414), the source DR can continue to monitor the multicast control packets (operation 410).

Figure 4B:
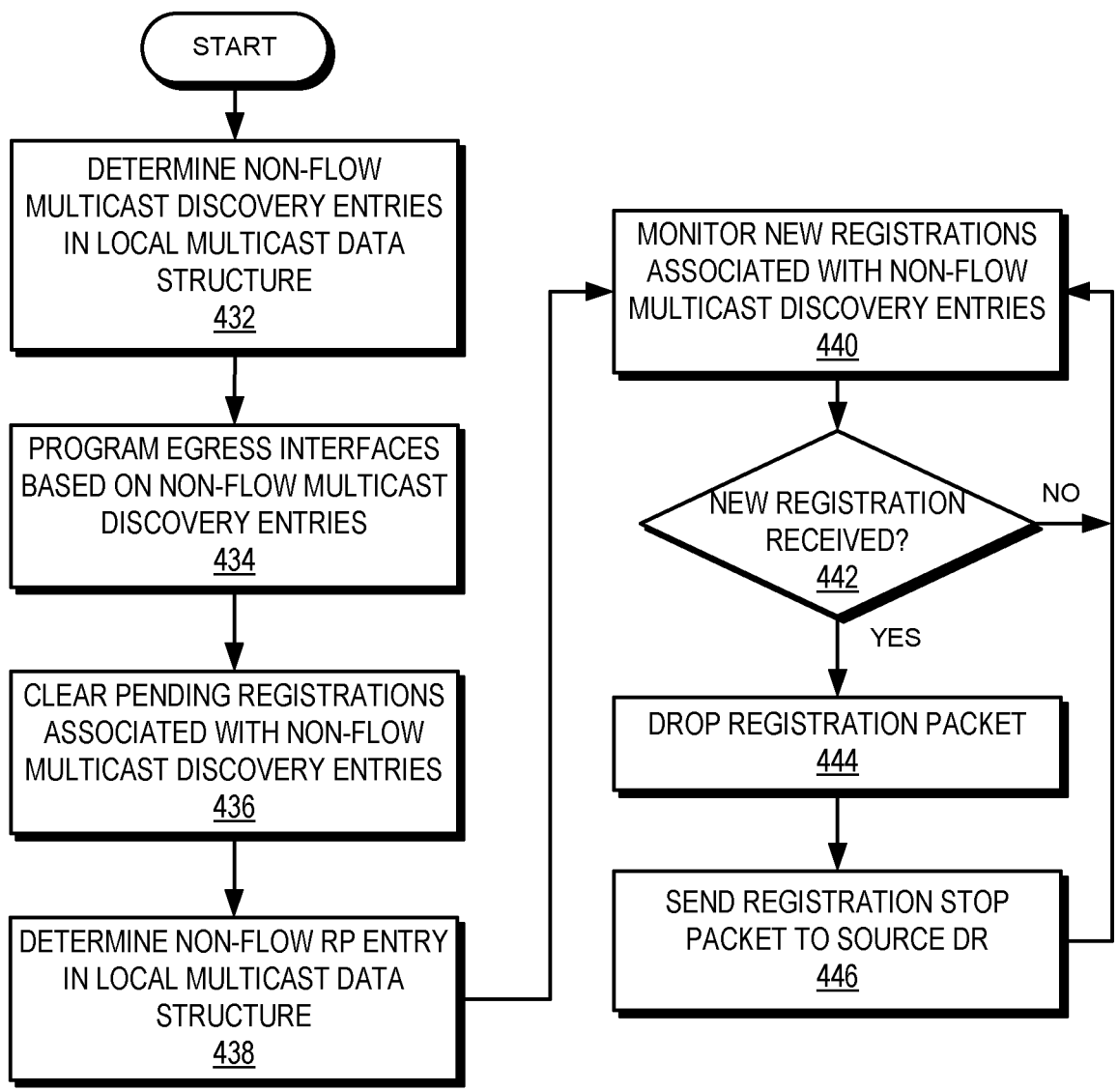
FIG. 4B presents a flowchart illustrating the process of an RP managing multicast control traffic associated with service discovery, in accordance with an aspect of the present application.

FIG. 4B presents a flowchart illustrating the process of an RP managing multicast control traffic associated with service discovery, in accordance with an aspect of the present application. During operation, the RP can determine non-flow multicast discovery entries in a local multicast data structure (operation 432). The RP can then program egress interfaces based on the non-flow multicast discovery entries (operation 434). Accordingly, the RP can clear the pending registrations associated with the non-flow multicast discovery entries (operation 436).

The RP can also determine a non-flow RP entry in the local multicast data structure (operation 438). The RP can then monitor for new registrations associated with the non-flow multicast discovery entries (operation 440). The RP can then determine, for a respective received packet, whether the packet is a new registration packet (operation 442). If the RP receives a new registration packet, the RP can drop the new registration packet (operation 444) and send a registration stop packet to the source DR (operation 446). If a new registration packet is not received (operation 442) or upon sending the registration stop packet (operation 446), the RP can continue to monitor the new registrations (operation 440).

Figure 4C:
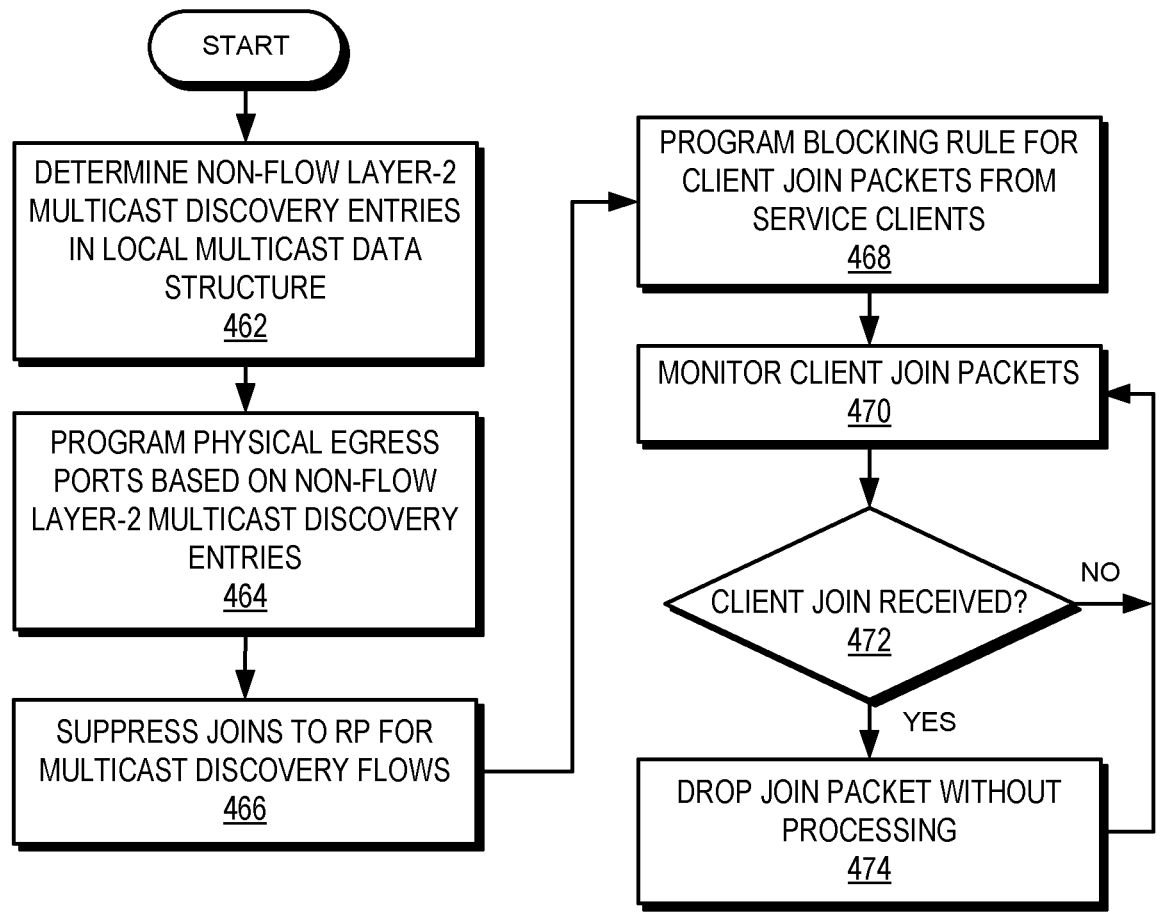
FIG. 4C presents a flowchart illustrating the process of a client DR managing multicast control traffic associated with service discovery, in accordance with an aspect of the present application.

FIG. 4C presents a flowchart illustrating the process of a client DR managing multicast control traffic associated with service discovery, in accordance with an aspect of the present application. During operation, the client DR can determine non-flow layer-2 multicast discovery entries in a local multicast data structure (operation 462). The entries can be programmed by a user or generated by the client DR based on information associated with the sources. The client DR can then program egress ports (e.g., physical port of the client DR) based on the non-flow layer-2 multicast discovery entries (operation 464). Accordingly, the client DR can suppress the joins to the RP for the multicast discovery flows (operation 466).

The client DR can then program a blocking rule for client join packets from service clients (operation 468). Subsequently, the client DR can monitor the client join packets (operation 470). The client DR can then determine, for a respective received packet, whether the packet is a client join (operation 472). If the client DR receives a client join, the client DR can drop the join packet without processing (operation 474). If a client join is not received (operation 472) or upon dropping the join packet (operation 474), the client DR can continue to monitor the client join packets (operation 470).

Figure 5:
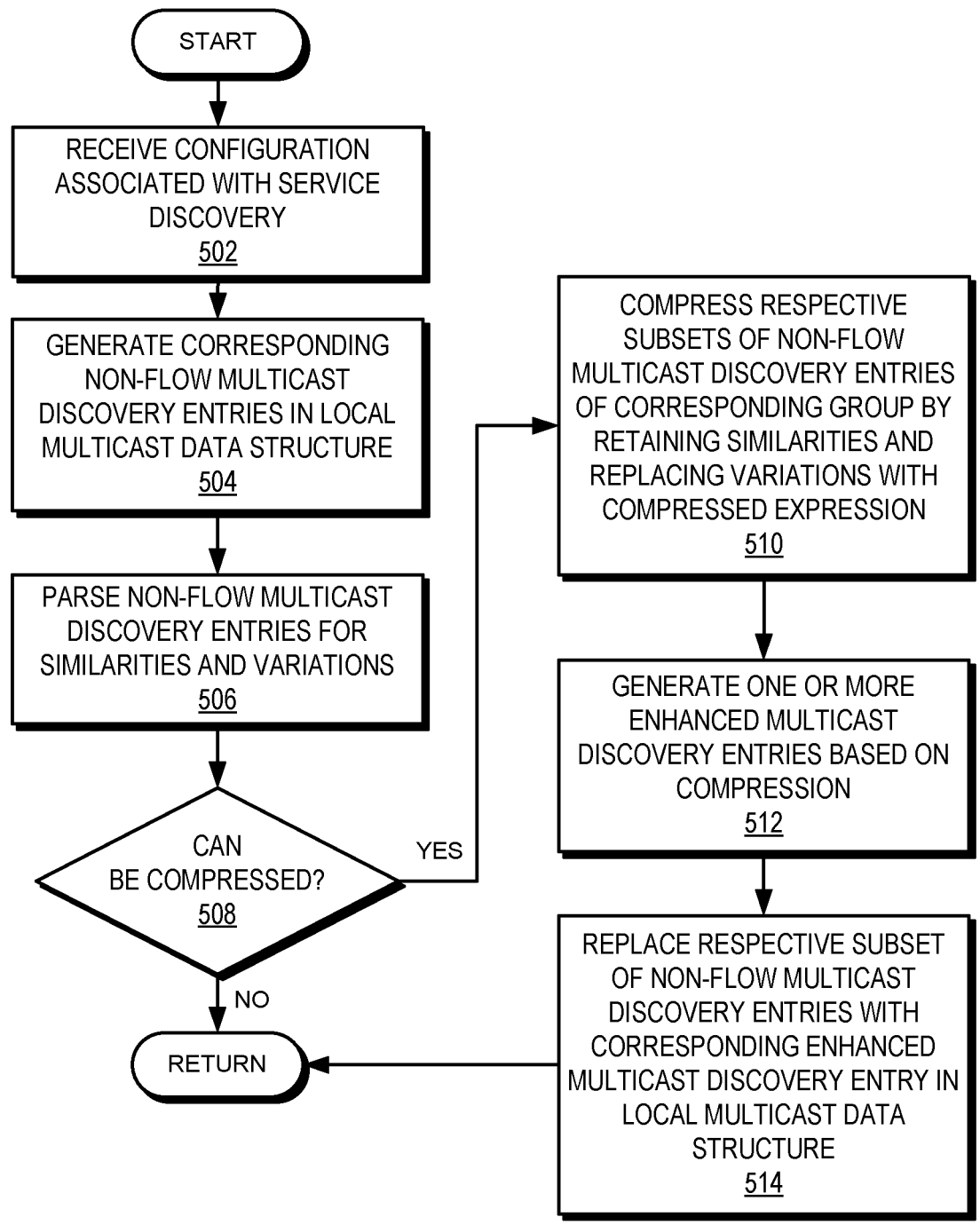
FIG. 5 presents a flowchart illustrating the process of a switch generating enhanced discovery entries from non-flow multicast discovery entries, in accordance with an aspect of the present application.

FIG. 5 presents a flowchart illustrating the process of a switch generating enhanced discovery entries from non-flow multicast discovery entries, in accordance with an aspect of the present application. During operation, the switch can receive configuration associated with service discovery (operation 502) and generate corresponding non-flow multicast discovery entries in the local multicast data structure (operation 504). The switch can then parse the non-flow multicast discovery entries for similarities and variations (operation 506). Subsequently, the switch can determine whether the discovery entries can be compressed (operation 508).

If the discovery entries can be compressed, the switch can compress respective subsets of non-flow multicast discovery entries of the corresponding group by retaining the similarities and replacing the variations with a compressed expression (e.g., an *) (operation 510). The switch can generate one or more enhanced multicast discovery entries based on the compression (operation 512). The switch can then replace a respective subset of the non-flow multicast discovery entries with the corresponding enhanced multicast discovery entry in the local multicast data structure (operation 514).

Figure 6:
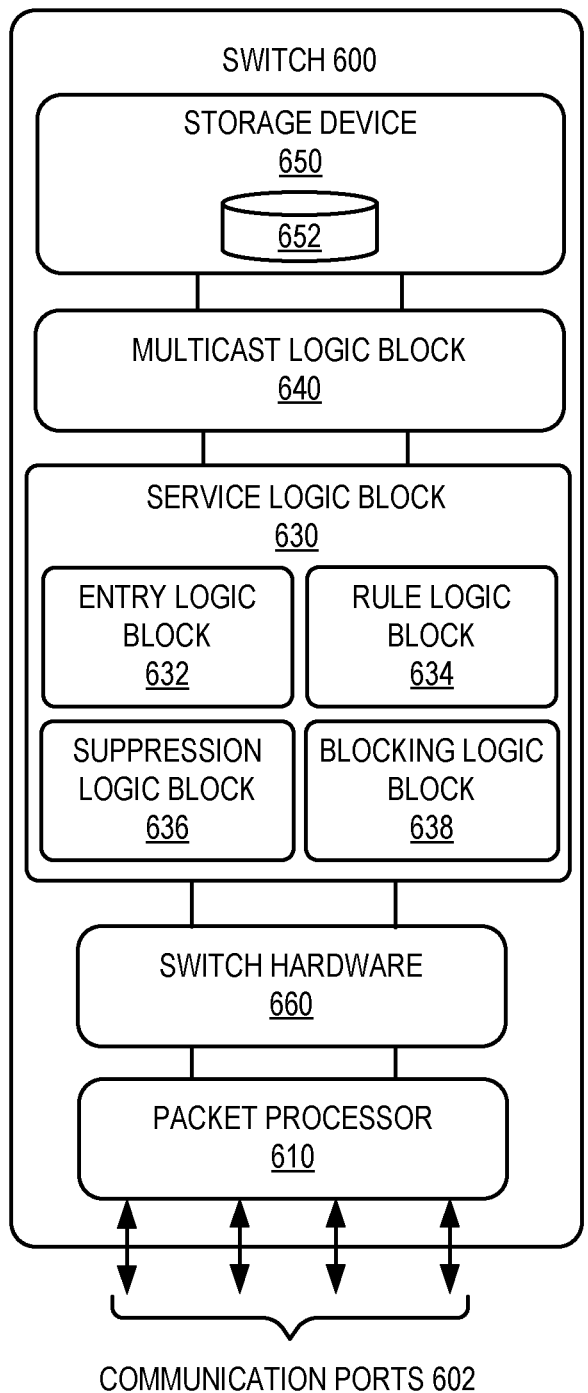
FIG. 6 illustrates an example of a switch supporting efficient multicast control traffic management for service discovery, in accordance with an embodiment of the present application.

FIG. 6 illustrates an example of a switch supporting efficient multicast control traffic management for service discovery, in accordance with an embodiment of the present application. In this example, a switch 600 includes a number of communication ports 602, a packet processor 610, and a storage device 650. Switch 600 can also include switch hardware 660 (e.g., processing hardware of switch 600, such as its application-specific integrated circuit (ASIC) chips), which includes information based on which switch 600 processes packets (e.g., determines output ports for packets). Packet processor 610 extracts and processes header information from the received packets. Packet processor 610 can identify a switch identifier (e.g., a MAC address and/or an IP address) associated with switch 600 in the header of a packet.

Communication ports 602 can include inter-switch communication channels for communication with other switches and/or user devices. The communication channels can be implemented via a regular communication port and based on any open or proprietary format. Communication ports 602 can include one or more Ethernet ports capable of receiving frames encapsulated in an Ethernet header. Communication ports 602 can also include one or more IP ports capable of receiving IP packets. An IP port is capable of receiving an IP packet and can be configured with an IP address. Packet processor 610 can process Ethernet frames and/or IP packets. A respective port of communication ports 602 may operate as an ingress port and/or an egress port.

Switch 600 can maintain a database 652 (e.g., in storage device 650). Database 652 can be a relational database and may run on one or more DBMS instances. Database 652 can store information associated with efficient multicast control traffic management for service discovery at switch 600. For example, the information can include non-flow multicast discovery entries, a non-flow RP entry, and non-flow layer-2 multicast discovery entries.

Switch 600 can include a multicast logic block 640 that facilitates generating entries for a local multicast data structure and forwarding multicast data packets based on the entries. Switch 600 can also include a service logic block 630, which can include an entry local block 632, a rule logic block 634, a suppression logic block 636, and a blocking logic block 638. Entry local block 632 can program non-flow multicast discovery entries, a non-flow RP entry, and non-flow layer-2 multicast discovery entries in corresponding local data structures. Entry local block 632 can also generate non-flow enhanced discovery entries based on compression or consolidation.

Rule logic block 634 can program rules (e.g., ACL rules) associated with service discovery for switch 600, such as a rule instructing switch 600 to drop joins associated with service discovery. Suppression logic block 636 can suppress the forwarding of multicast control packets matching the non-flow discovery entries. Blocking logic block 638 can preclude switch hardware 660 from processing multicast control packets matching the non-flow discovery entries. Blocking logic block 638 may also drop such packets.

One aspect of the present technology can provide a system for facilitating efficient multicast traffic management for service discovery. During operation, the system can identify a set of multicast entries corresponding to a multicast group associated with a multicast flow in a local multicast forwarding data structure of a switch. A respective entry of the multicast forwarding data structure can indicate how a corresponding multicast packet is forwarded. If a subset of the multicast entries shares one or more network parameters, the system can compress the subset of the multicast entries based on the shared network parameters to generate a generic entry. The generic entry can then replace the subset of the multicast entries in the multicast forwarding data structure. Subsequently, the system can determine a multicast forwarding role of the switch for a respective multicast entry associated with the multicast flow and filter one or more types of multicast control messages received at the switch based on the multicast forwarding role. Here, the one or more types of multicast control messages can be directed to the multicast entry.

In a variation on this aspect, filtering the one or more types of multicast control messages can include one or more of: suppressing forwarding of the one or more types of multicast control messages for the multicast group, and dropping the one or more types of multicast control messages.

In a variation on this aspect, if the multicast forwarding role includes a source designated router (DR) for a multicast entry, the system can preclude the source DR from sending a multicast register packet to a rendezvous point (RP) of the multicast group and apply a rule for filtering network join/prune packets for the multicast group from a downstream switch.

In a further variation, the system can generate an access control list (ACL) comprising the rule.

In a variation on this aspect, the multicast flow is associated with a Simple Service Discovery Protocol (SSDP).

In a variation on this aspect, if the multicast forwarding role includes an RP for a multicast entry, the system can determine a multicast entry for an RP interface for the multicast group in the multicast forwarding data structure of the switch and send a stop register packet for the multicast group to a source DR.

In a further variation, the system can clear a respective pending registration for the multicast group and preclude the RP from processing a subsequent registration.

In a variation on this aspect, if the multicast forwarding role includes a client designated router (DR) for a multicast entry, the system can identify a set of port-based layer-2 multicast entries associated with the multicast group in a second multicast forwarding data structure of the switch. The system can then suppress the client joins received from clients of SSDP based on the second multicast forwarding data structure.

In a further variation, the system can apply a rule for filtering client joins for the multicast group for one hop.

In a variation on this aspect, the one or more shared parameters can include an ingress interface, a group address of the multicast group, and a list of egress interfaces. The generic entry can include a wildcard value for a non-shared parameter.

In a variation on this aspect, the system can forward a multicast data packet for the multicast group based on the multicast forwarding data structure without processing a multicast control packet for the multicast group.

The data structures and code described in this detailed description are typically stored on a computer-readable storage medium, which may be any device or medium that can store code and/or data for use by a computer system. The computer-readable storage medium includes, but is not limited to, flip/flops, latches, registers, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of examples of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method, comprising:
   identifying, by a switch, a set of multicast entries corresponding to a multicast group associated with a multicast flow in a multicast forwarding data structure, wherein each entry of the multicast forwarding data structure indicates how a corresponding multicast packet is forwarded;
   in response to determining that a subset of the multicast entries share one or more network parameters, compressing the subset of the multicast entries based on the shared network parameters to generate a generic entry, wherein the generic entry replaces the subset of the multicast entries in the multicast forwarding data structure;
   determining a multicast forwarding role of the switch for the generic multicast entry associated with the multicast flow; and
   filtering one or more types of multicast control messages received at the switch based on the multicast forwarding role, wherein the one or more types of multicast control messages are directed to the multicast entry.

2. The method of claim 1, wherein filtering the one or more types of multicast control messages further comprises one or more of:
   suppressing forwarding of the one or more types of multicast control messages for the multicast group; and
   dropping the one or more types of multicast control messages.

3. The method of claim 1, wherein, in response to the multicast forwarding role including a source designated router (DR) for a multicast entry, the method further comprises:
   precluding the source DR from sending a multicast register packet to a rendezvous point (RP) of the multicast group; and
   applying a rule for filtering network join or prune packets for the multicast group from a downstream switch.

4. The method of claim 1, wherein the multicast flow is associated with a Simple Service Discovery Protocol (SSDP).

5. The method of claim 1, wherein, in response to the multicast forwarding role including an RP for a multicast entry, the method further comprises:
   determining a multicast entry for an RP interface for the multicast group in the multicast forwarding data structure; and
   sending a stop register packet for the multicast group to a source DR.

6. The method of claim 5, further comprising clearing a respective pending registration for the multicast group and precluding the RP from processing a subsequent registration.

7. The method of claim 1, wherein, in response to the multicast forwarding role including a client DR for a multicast entry, the method further comprises:
   identifying, by the switch, a set of port-based layer-2 multicast entries associated with the multicast group in a second multicast forwarding data structure; and
   suppressing client joins received from clients of the multicast flow based on the second multicast forwarding data structure.

8. The method of claim 7, further comprising applying a rule for filtering client joins for the multicast group for one hop.

9. The method of claim 1, wherein the one or more shared parameters include an ingress interface, a group address of the multicast group, and a list of egress interfaces, and wherein the generic entry includes a wildcard value for a non-shared parameter.

10. The method of claim 1, further comprising forwarding a multicast data packet for the multicast group based on the multicast forwarding data structure without processing a multicast control packet for the multicast group.

11. A non-transitory computer-readable storage medium storing instructions that when executed by a computing system cause the computing system to perform a method, the method comprising:
    identifying, by the computing system, a set of multicast entries corresponding to a multicast group associated with a multicast flow in a multicast forwarding data structure, wherein each entry of the multicast forwarding data structure indicates how a corresponding multicast packet is forwarded;
    in response to determining that a subset of the multicast entries share one or more network parameters, compressing the subset of the multicast entries based on the shared network parameters to generate a generic entry, wherein the generic entry replaces the subset of the multicast entries in the multicast forwarding data structure;

determining a multicast forwarding role of the computing system for the generic multicast entry associated with the multicast flow; and filtering one or more types of multicast control messages received at the computing system based on the multicast forwarding role, wherein the one or more types of multicast control messages are directed to the multicast entry.

12. The non-transitory computer-readable storage medium of claim 11, wherein filtering the one or more types of multicast control messages further comprises one or more of:

suppressing forwarding of the one or more types of multicast control messages for the multicast group; and dropping the one or more types of multicast control messages.

13. The non-transitory computer-readable storage medium of claim 11, wherein, in response to the multicast forwarding role including a source designated router (DR) for a multicast entry, the method further comprises:

precluding the source DR from sending a multicast register packet to a rendezvous point (RP) of the multicast group; and applying a rule for filtering network join or prune packets for the multicast group from a downstream switch.

14. The non-transitory computer-readable storage medium of claim 11, wherein, in response to the multicast forwarding role including an RP for a multicast entry, the method further comprises:

determining a multicast entry for an RP interface for the multicast group in the multicast forwarding data structure; and sending a stop register packet for the multicast group to a source DR.

15. The non-transitory computer-readable storage medium of claim 14, wherein the method further comprises clearing a respective pending registration for the multicast group and precluding the RP from processing a subsequent registration.

16. The non-transitory computer-readable storage medium of claim 11, wherein, in response to the multicast forwarding role including a client DR for a multicast entry, the method further comprises:

identifying, by the computing system, a set of port-based layer-2 multicast entries associated with the multicast group in a second multicast forwarding data structure; and suppressing client joins received from clients of the multicast flow based on the second multicast forwarding data structure.

17. The non-transitory computer-readable storage medium of claim 16, wherein the method further comprises applying a rule for filtering client joins for the multicast group for one hop.

18. The non-transitory computer-readable storage medium of claim 11, wherein the one or more shared parameters include an ingress interface, a group address of the multicast group, and a list of egress interfaces, and wherein the generic entry includes a wildcard value for a non-shared parameter.

19. The non-transitory computer-readable storage medium of claim 11, wherein the method further comprises forwarding a multicast data packet for the multicast group based on the multicast forwarding data structure without processing a multicast control packet for the multicast group.

20. A computer system, comprising:
processing circuitry;
forwarding hardware;
an entry logic block to:
    identify, at the computing system, a set of multicast entries corresponding to a multicast group associated with a multicast flow in a multicast forwarding data structure of the computing system, wherein each entry of the multicast forwarding data structure indicates how a corresponding multicast packet is forwarded; and
    in response to determining that a subset of the multicast entries share one or more network parameters, compress the subset of the multicast entries based on the shared network parameters to generate a generic entry, wherein the generic entry replaces the subset of the multicast entries in the multicast forwarding data structure; and
a filtering logic block to:
    determine a multicast forwarding role of the computing system for the generic multicast entry associated with the multicast flow; and
    filter one or more types of multicast control messages received at the computing system based on the multicast forwarding role, wherein the one or more types of multicast control messages are directed to the multicast entry.

* * * * *